Sept. 20, 1966  D. F. PRUSAK ET AL  3,273,814
ROTATING DISPENSING APPARATUS
Filed April 1, 1964  3 Sheets-Sheet 1

INVENTORS
DONALD F. PRUSAK
THEODORE E. CRAWFORD
BY
Andrus & Starke
Attorneys

Sept. 20, 1966 D. F. PRUSAK ET AL 3,273,814
ROTATING DISPENSING APPARATUS
Filed April 1, 1964 3 Sheets-Sheet 2

INVENTORS
DONALD F. PRUSAK
THEODORE E. CRAWFORD
BY
Andrus & Starke
Attorneys

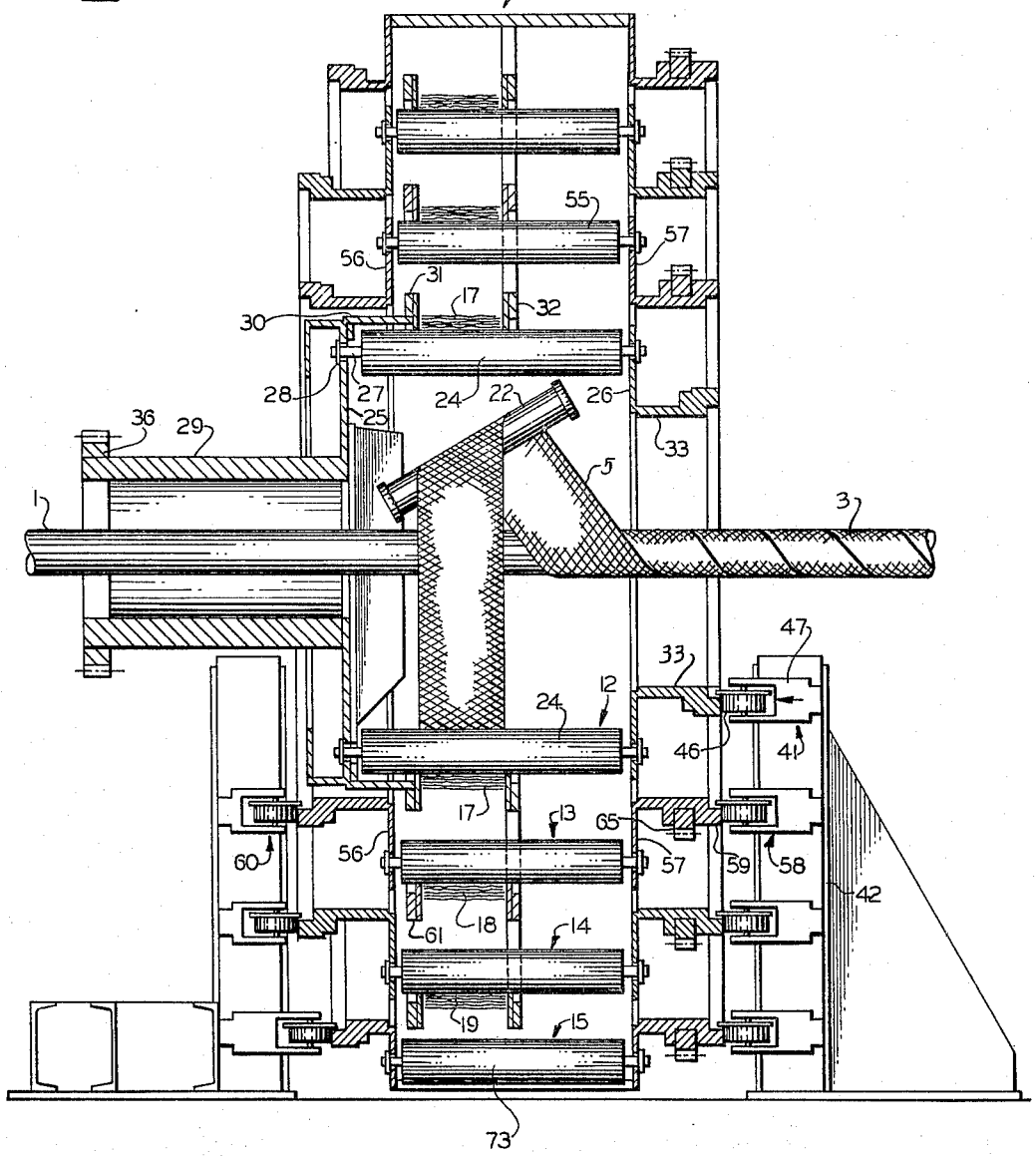

United States Patent Office 3,273,814
Patented Sept. 20, 1966

3,273,814
ROTATING DISPENSING APPARATUS
Donald F. Prusak and Theodore E. Crawford, Milwaukee, Wis., assignors to Dowsmith Inc., Milwaukee, Wis., a corporation of Delaware
Filed Apr. 1, 1964, Ser. No. 356,602
6 Claims. (Cl. 242—55)

This invention relates to rotating dispensing apparatus and particularly to such apparatus for distributing a continuous strand-like member such as a resin impregnated glass fiber strip or ribbon upon a mandrel to form a tubular member.

Although the present invention may be generally employed for supplying a series of strips or strands of indefinite length as a continuous length, it is particularly adapted for the formation of tubular members and the like by spiral wrapping of a resin impregnated glass fiber strip upon a suitably moving support; for example, as shown in United States Patent 3,099,190 which issued July 30, 1963 to Chester Allen, Jr., et al., entitled Strip Winding Apparatus. The Allen et al. patent discloses a rotating head or spool carrying a supply of a resin impregnated glass fiber strip wound thereon. A cylindrical mandrel is continuously passed axially through the spool with the innermost end of the strip secured to the mandrel. The head is rotated in timed relation to the movement of the mandrel through the head to spirally wrap the strip on the mandrel in overlapping relationship to form a tubular member.

Generally, periodic stopping of the operation is required for replenishing of the material supply on the rotating head. This reduces the efficiency and increases the cost of the wrapping or forming operation.

Further, in the formation of members from resin impregnated glass fiber strips, the rotating head is preferably designed to function with a predetermined maximum and minimum depth of strip convolutions on the winding head. This limits the tape supply which can be provided and increases the frequency of stopping the apparatus for replenishing of the supply.

The present invention is particularly directed to a rotating dispensing apparatus including means to allow replenishing of the supply on the rotating head while the previously stored tape supply is being dispensed. In accordance with the present invention, a plurality of at least three concentric supply spools or reels are mounted for selective relative rotation with respect to each other. The inner reel is rotated in a manner to dispense the material supply thereon. Adjacent reels are threaded conversely to each other, the direction on the respective reels being determined by the takeoff from the innermost reel. In operation, to replenish the supply from an outside source, the outer supply reel is stopped while the innermost takeoff reel and at least the adjacent reel continue to rotate to dispense the tape from the innermost reel. The outside supply is spliced to the trailing tape end on the outermost reel which is then again rotated with the other reels to build up a tape supply on the outer reel. After a predetermined amount of the material is transferred to the outer reel, it is again stopped, the material cut from the supply and the end secured in place to prevent unravelling. Transfer of the tape from the outer reels onto the intermediate and inner reels is accomplished by establishing relative rotation between the adjacent reels.

In the preferred construction for the apparatus, four concentric reels are employed with the three inner reels serving as material supply storage units and with the outermost reel holding the end of the tape carried on the outer supply reel. This eliminates problems of securing the tape end to prevent frayed edges and the like.

The present invention provides a reliable method and apparatus for the continuous feeding of a flexible member of indefinite length and is particularly directed for high-speed continuous winding of a resinous reinforced glass fiber strip or tape for the formation of glass fiber reinforced tubular members and the like with an optimum tape supply on the winding head.

The drawings furnished herewith illustrate the best mode presently contemplated for carrying out the invention.

In the drawings:

FIG. 5 is a vertical section taken on line 5—5 of FIG. 3.

Figure 1:
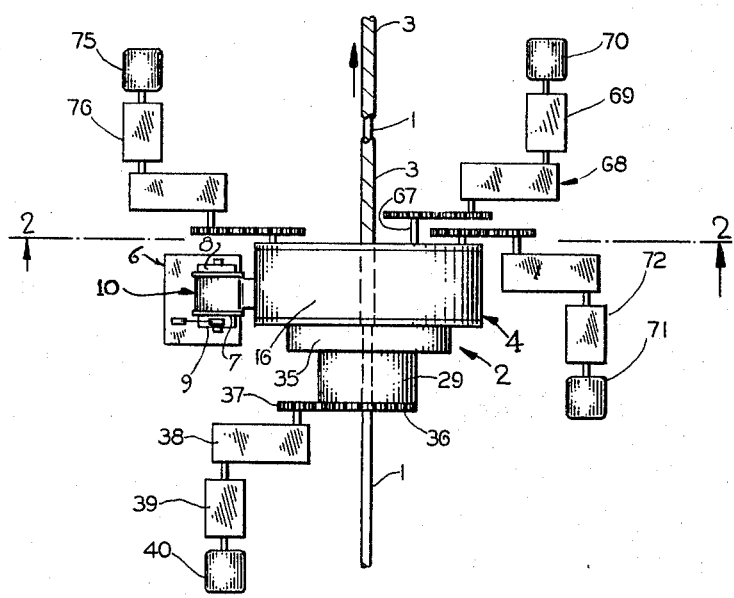
FIG. 1 is a diagrammatic layout of a tubular pipe forming system including a winder of the present invention.
Figure 2:
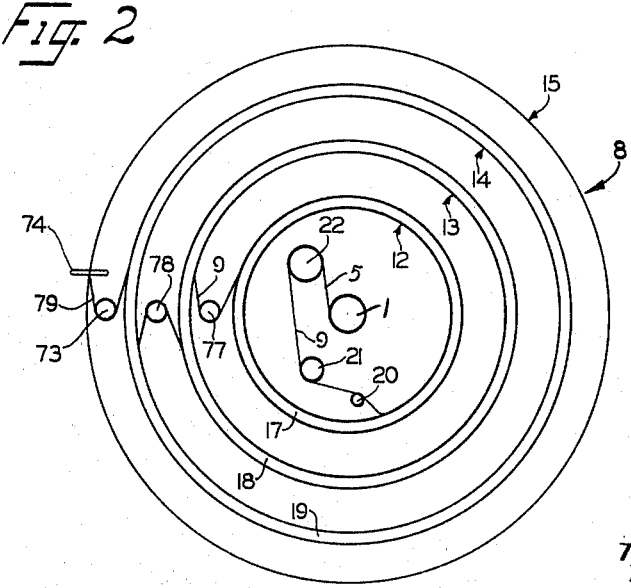
FIG. 2 is a diagrammatic illustration of the winding head more clearly showing the functional relationship between the winding heads and the movement of the resinous reinforced glass fiber strip between the several reels.

Referring to the drawings and particularly to FIG. 1, a diagrammatic layout of a fiber glass pipe forming assembly is shown in which a plurality of mandrels 1 are secured in end-to-end relationship in any suitable manner, not shown, and passed through a winding head assembly 2 as a continuous winding form. In passing through assembly 2, a spiral wrap of a resin impregnated glass fiber covering 3 is provided and allowed to cure or set and thereby form a reinforced plastic tube member.

The assembly 2 includes a winding head 4 which spirally wraps a resin impregnated glass fiber tape 5 onto the mandrel 1 with the adjacent convolutions partially overlapped as more clearly shown in FIG. 5 to form the covering 3. A tape supply unit 6 is mounted adjacent one side of the winding head 4 to replenish the tape supply to the winding head 4 such that an uninterrupted spiral winding of the tape 5 onto the mandrels 1 can be maintained. From the winding head 4, the covered mandrels 1 are fed to a wrapped mandrel storage or the like, not shown, where they are separated and stored for subsequent handling and processing.

Generally, the illustrated tape supply unit 6 includes a tape reel 7 freely rotatable between suitable bearings 8 and 9 to permit free rotation of reel 7. Tape 10 corresponding to tape 5 is carried by reel 7 and includes an outer free end 11 which is secured to a trailing end of tape 5 as hereinafter described.

Figure 3:
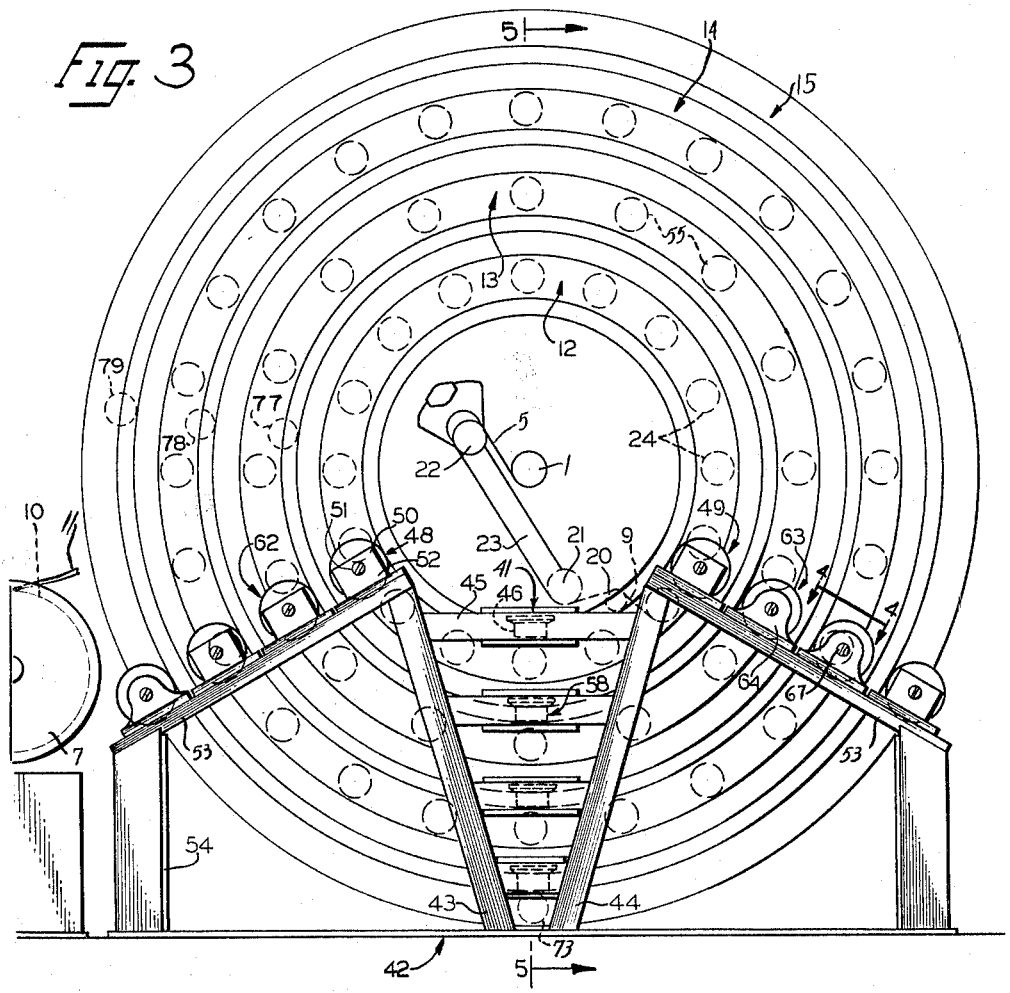
FIG. 3 is an enlarged elevational view of a simplified winding head structure.
Figure 4:
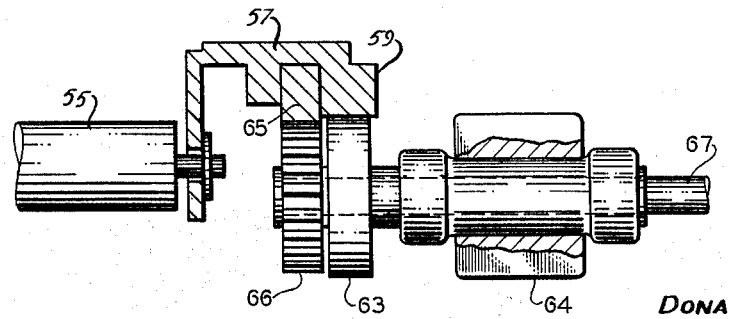
FIG. 4 is a sectional view taken on line 4—4 of FIG. 3.

Referring particularly to FIGS. 3-5, the winding head 4 of this invention includes four concentrically arranged tape supply reels 12-15, inclusive, with the inner reel being numbered 12 and the outer reel being numbered 15. The reels 12-15 are disposed within an outer protective annular shell 16, shown only in FIG. 1. Resin impregnated glass fiber tape 5 is wound on the three inner reels 12 through 14 as a continuous strip to provide the respective interconnected tape supplies 17, 18 and 19. The trailing end or edge of the tape is secured to the outer reel 15 as hereinafter described.

Within the inner reel 12, a small takeoff roller 20 is provided immediately adjacent and rearwardly spaced from the takeoff point of tape 5 from the reel. The tape 5 passes over the takeoff roller 20 around a suitable idler pivot roller 21 to a distributing arm roller 22 secured to an adjustable arm 23 also carried by reel 12. Roller 22 is set to determine the spiral wrap angle of the tape 5 on the mandrel.

In moving through the head 4, the tape 5 is taken or fed successively from the reel 14 to reel 12 and then onto the mandrel 1 to form the tubular covering and member 3. Reels 12–15 are similarly supported on a supporting base assembly for individually controlled rotation, as hereinafter described.

Reel 12 includes a plurality of circumferentially distributed rollers 24 journaled and mounted between a pair of lateral side plates 25 and 26. Each roller 24 includes a central supporting shaft 27 which projects through an opening in the plates 25 and 26 with locking rings 28 fitted within a groove in the shaft adjacent the outer face of the plates to lock the roller in place. The inner side plate 25 is integrally formed as the outer end of a hub section 29 through which the mandrel passes. A ring flange 30 is secured to the outer edge of the inner plate 25 and projects axially inwardly about the rollers 24. The outer end of the flange terminates in a radially directed ring guide 31 for the adjacent edge of the built-up tape supply 17. A cooperative ring guide 32 is centrally adjustably mounted to adapt the winding head 4 to tapes 5 of differing widths.

The opposite end of each roller in reel 12 is similarly mounted in the opposite side plate 26 which has a generally L-shaped cross section with an outwardly extending leg 33 integrally secured to the plate.

Reel 12 is rotatably supported and driven at the opposite sides thereof as follows.

On the infeed end, to the left in FIG. 5, the hub section 29 is supported in a bearing member 35. A drive ring gear 36 is secured to the outermost end of the hub section 29 and mates with a gear 37 as shown in FIG. 1. Gear 37 is coupled through a gear ratio change box 38 and a coupling 39 to an electric motor 40 for selected rotation of the hub and thereby reel 12. The opposite side of reel 12 is supported in the axial direction by a wheel unit 41 carried by a supporting frame or base assembly 42.

Referring particularly to FIGS. 3 and 5, the base assembly includes a pair of central leg members 43 and 44 which extend upwardly defining a V-shaped opening therebetween. Wheel unit 41 is secured to a cross arm 45 which is secured to the upper ends of the leg members 43 and 44 substantially in alignment with the flange 33 of side plate 26. A flanged wheel 46 is rotatably mounted in a wheel support 47 secured to the cross arm 45 and bears on the outer peripheral surface of the flange 33 which is finished to provide a bearing surface to absorb the axial thrust forces while permitting rotation of reel 12.

Reel 12 is vertically supported for rotation about the axis of mandrel 1 by a pair of wheel units 48 and 49 similarly mounted on opposite sides of the wheel unit 41 upon the base assembly 42. Each of the wheel units 48 and 49 includes a wheel 50 located within the encircling flange 33 of the side plate 26 and with the flange resting thereon. Wheel 50 is secured to a shaft 51 which is rotatably journaled in a block 52 mounted upon a cross frame member 53 which extends laterally from the corresponding support legs 43 and 44. The cross frame members 53 slant downwardly and are supported at the outer ends by a vertical leg 54.

Reels 13 and 14 are substantially identically constructed except for the difference in diameter. Reel 13 is specifically described and includes circumferentially distributed rollers 55 mounted, as are rollers 24, between annular side plates 56 and 57 which correspond to the outer side plate 26 of reel 12.

A wheel unit 58 is secured between the vertical legs 43 and 44 and engages the support ring or flange 59 of plates 57 to support the reel 13 in an axial direction.

As shown in FIG. 5, a similar wheel unit 60 is similarly mounted to the opposite side of the reel 13 for supporting the corresponding reel in the opposite axial direction. A tape guide 61 is secured to the radially outer edges of the side plate 56 to guide or direct the built-up tape supply 18 on the reel 13.

The reel 13 is vertically supported on opposite sides in a similar manner for rotation by rotating wheels 62 and 63 which are rotatably carried in similar bearing blocks 64 on the cross frame member 53 immediately adjacent the wheels 48 and 49 for reel 12.

Reels 13 and 14 additionally include a ring gear 65 secured to the outer periphery of the support ring or leg of the outer side plate 57 immediately adjacent the vertical supporting bearing surface 59. The illustrated ring gear 65 is shown press fitted into an appropriate groove in the outer surface of the ring flange of the reels. A drive gear 66 is secured to the innermost end of the shaft 67 for the vertical support wheel 63. The particular shaft 67 projects through the pillow block 64 and is coupled by suitable coupling gear unit 68 and an adjustable speed coupling 69 to a motor 70 for rotating the reel 13, at the speeds the same or different than the other reels 12, 14 and 15.

A separate motor 71 is similarly connected by an adjustable speed coupling 72 to drive the reel 14.

The outermost reel 15 generally corresponds in structure and support to reels 13 and 14 with the exception that the spaced rollers are not required as tape 5 is not stored on this reel. Reel 15 includes a single roller 73 over which the tape end is passed and fixedly and releasably secured by a spring loaded clamp 74.

A separate motor 75 and adjustable speed coupling 76 are connected to drive reel 15. The variable drive coupling 76 permits adjustment of the rotational speed of the reel 15 relative to the other reels 12, 13 and 14.

When the reels are all rotating at the same speed, there is no movement of tape supply from the respective reel to an adjacent reel. The tape supply on reel 12 is then withdrawn and applied to the mandrel 1.

Takeoff or transfer rollers 77 and 78 are secured between the respective side plates of reels 13 and 14 adjacent the outer or back side thereof and the tape 10 passes from the reels over these transfer rollers onto the rollers of the adjacent reel.

Thes tape 5 is threaded on the reels 12 through 14 in a converse manner. In the illustrated embodiment of the invention, tape 9 is threaded or wound on the reel 12 in a counterclockwise direction to form supply 17. The tape supply 18 on the reel 13 is wound in an opposite or clockwise direction and the supply 19 and reel 14 is again wound in a counterclockwise direction. The outermost trailing edge 79 of tape 9 is folded back over the roller 73 and tied to the reel 15 by the releasable clamp 74.

When it is desired to replenish the tape supply 19 on the reel 14, the reels 14 and 15 are stopped while reels 12 and 13 continue to rotate in the clockwise direction. The trailing edge 79 of tape 5 is unclamped from the reel 15 and spliced to the tape end 11 of the tape 10 of tape supply unit 6 in any suitable or known manner of splicing.

The reel 14 is then rotated with reels 12 and 13 with reel 15 held stationary. As a result, tape 10 is pulled from the unit 6 and wrapped about the reel 14 to build up or replenish the tape supply 19. When a sufficient supply has been accumulated on the reel 14, the latter is stopped, the tape cut and the new trailing end 79 again clamped to the reel 15 by clamp 74.

When the reels 14 and 15 are stopped, the tape supply 18 on reel 13 is transferring to reel 12 and adding to tape supply 17. When it is desired to transfer the tape supply 19 on reel 14 to tape supply 18 on reel 13, the speed of reel 13 is reduced. Supply 18 on reel 13 increases sufficintly to permit a subsequent replenishing of the tape supply 19.

If the supply 17 on reel 12 becomes excessive or is to be reduced for any reason, the reels 13, 14 and 15 are rotated at a similar greater increment than reel 12. The particular incremental speed is dependent upon the amount of material wound per revolution.

The present embodiment is given to clearly illustrate the invention and may vary substantially in details of construction. For example, the several reels may be driven from a single drive through suitable individually adjustable couplings or the like.

The present invention thus provides a system for continuous, uninterrupted wrapping from a series of lineal pieces of material with optimum amounts of the material on the winding head.

Various modes of carrying out the invention are contemplated as being within the scope of the following claims particularly pointing out and distinctly claiming the subject matter which is regarded as the invention.

We claim:

1. A material dispensing system for continuous supplying a flexible elongated element, comprising
   a plurality of concentrically and rotatably mounted reels and adapted to rotate relative each other to wind,
   a flexible elongated element on said reels with adjacent reels being conversely wound,
   means to unwind the element internally of the innermost reel, and
   means to stop rotation of an outermost of said reels while maintaining rotation of the inner of said reels for attaching of an additional length of said element to the outermost end of the element.

2. The material dispensing system of claim 1 having at least three concentric reels for carrying said element and an outer independently rotatable means having releasable clamp means secured to the end of the element.

3. A material dispensing system for continuous supplying a flexible elongated element, comprising
   at least three concentrically and rotatably mounted reels and adapted to rotate relative each other,
   a flexible elongated element wound on said reels with adjacent reels conversely wound and adapted to be unwound internally of the innermost reel, and
   means to stop rotation of an outermost of said reels while maintaining rotation of the inner of said reels for attaching of an additional length of said element to the outer element end of said outermost reel.

4. A material dispensing system for continuous feeding a flexible elongated element, comprising
   at least three concentrically and rotatably mounted reels and adapted to rotate relative each other, each of said reels including a plurality of circumferentially spaced rollers upon which a flexible elongated element is carried witht adjacent reels conversely wound and having a take-off roller mounted within the adjacent inner reel,
   means to unwind the element internally of the innermost reel, and
   drive means to rotate the reels at independently adjustable speeds and including means to stop rotation of the outermost of said reels while maintaining rotation of the inner two of said reels for attaching of an additional length of said element to the outer element end.

5. A dispensing apparatus for continuous and uninterrupted feeding of an elongated flexible element which comprises
   four concentric reels disposed in radially spaced relation,
   means to rotate said reels in the same direction independently of each other and including means to vary the relative speed of the reels and to stop the two outermost reels while maintaining rotation of said two innermost reels,
   a length of said flexible element being wound on the inner three of said reels with adjacent reels being conversely wound, and
   means to releasably secure the outer end of the flexible element to the outermost reel and adapted to have another length of the element spliced thereto.

6. A dispensing apparatus for continuous and uninterrupted feeding of an elongated fiber glass tape, which comprises
   four concentric reels disposed in radially spaced relation, the three inner reels including circumferentially spaced rollers defining a tape supporting surface and having an inwardly disposed take-off roller and the outer of said reels including a releasable clamp,
   means to rotate said reels in the same direction independently of each other and including means to vary the relative speed of the reels and to stop the two outermost reels while maintaining rotation of said two innermost reels, and
   a length of said tape being wound on the inner three of said reels with adjacent reels being conversely wound and with the outer end of the flexible element disposed within the releasable clamp of the outermost reel.

References Cited by the Examiner

UNITED STATES PATENTS

| 877,200 | 1/1908 | Keefe | 242—104 |
|---|---|---|---|
| 1,336,050 | 4/1920 | Rosier | 242—55 |
| 2,129,916 | 9/1938 | Erickson | 242—104 |
| 2,318,316 | 5/1943 | Lawrence | 242—55.19 X |
| 2,614,765 | 10/1952 | Del Pozo | 242—77.7 |

FOREIGN PATENTS 250,112   3/1964   Australia.

FRANK J. COHEN, *Primary Examiner.*

MERVIN STEIN, STANLEY N. GILREATH,
*Examiners.*

W. S. BURDEN, *Assistant Examiner.*